| United States Patent [19] | | [11] Patent Number: 5,003,005 |
|---|---|---|
| Vitkuske et al. | | [45] Date of Patent: Mar. 26, 1991 |

[54] COPOLYMER BLENDS

[75] Inventors: John F. Vitkuske; Corwin J. Bredeweg, both of Midland, Mich.

[73] Assignee: The Dow Chemical Company, Midland, Mich.

[21] Appl. No.: 354,056

[22] Filed: May 19, 1989

Related U.S. Application Data

[63] Continuation-in-part of Ser. No. 810,488, Dec. 19, 1985, Pat. No. 4,847,326.

[51] Int. Cl.$^5$ ............... C08L 53/02; C08L 25/16; C08L 23/12; C08L 23/06
[52] U.S. Cl. ............................ 525/89; 525/98
[58] Field of Search ............................ 525/89

[56] References Cited

U.S. PATENT DOCUMENTS

| 3,445,543 | 5/1969 | Gruner . |
| 4,031,166 | 6/1977 | Bronstert et al. . |
| 4,188,432 | 2/1980 | Holden et al. . |
| 4,219,466 | 8/1980 | Yoshida et al. . |
| 4,302,554 | 11/1981 | Nabeta et al. . |
| 4,367,312 | 1/1983 | Bohtinck et al. . |
| 4,377,658 | 3/1983 | Collins . |
| 4,386,187 | 5/1983 | Grancio . |
| 4,495,323 | 1/1985 | Collins . |
| 4,525,532 | 6/1985 | Tung et al. . |
| 4,525,533 | 6/1985 | Bertrand et al. . |

FOREIGN PATENT DOCUMENTS

| 161837 | 12/1980 | Japan . |
| 38338 | 4/1981 | Japan . |
| 213039 | 2/1984 | Japan . |
| 2003891 | 3/1979 | United Kingdom . |

*Primary Examiner*—Carman J. Seccuro

[57] ABSTRACT

Novel copolymer blends comprising (a) a copolymer of alkenyl aromatic monomers containing from about 10 to about 70 percent by weight of an isopropenyl aromatic monomer, (b) a block copolymer of polystyrene blocks and conjugated diene blocks containing from about 15 to about 50 weight percent conjugated diene, (c) a block copolymer of polystyrene and conjugated diene blocks containing from about 55 to about 80 weight percent conjugated diene, and (d) 15 to 50 weight percent of a semicrystalline polyolefin.

8 Claims, No Drawings

COPOLYMER BLENDS

This is a continuation in part of pending application Ser. No. 810,488 filed Dec. 19, 1985, U.S. Pat. No. 4,847,326.

Alkenyl aromatic resins have found wide applications in commerce. Such resins have been found to be useful for injection molding, extrusion into shaped bodies, film preparation and the like. Generally, alkenyl aromatic resins tend to be rigid and oftentimes brittle. The problem of brittleness in the resins has been overcome to some degree by the addition of diene polymers such as synthetic and natural rubbers. Polymer blends of alkenyl aromatic resins and diene polymers have been prepared from a variety of methods including mechanical blending and mass polymerization of the alkenyl aromatic monomer in the presence of the diene rubber. Blends have also been prepared by emulsion polymerization techniques. Blends or mixtures of alkenyl aromatic resinous polymers and diene polymers generally exhibit reduced tensile strength over that of the alkenyl aromatic resin alone. However, their toughness or resistance to impact is generally substantially increased. The level of diene polymer employed therein is approximately 5 weight percent to about 25 weight percent of the total mixture.

Many block copolymers have been prepared generally possessing the configuration $AB(BA)_n$ wherein n is from about 0 to 5 inclusive, and A represents a block of alkenyl aromatic monomer and B represents a block of a polymer of one or more conjugated dienes. Block copolymers may vary in physical characteristics from a thermoplastic elastomer to a relatively rigid resinous material depending upon the proportion of the diene monomer polymerized therein. A wide variety of toughened alkenyl aromatic resinous compositions have been prepared by incorporating block copolymers primarily of the AB or ABA configuration into a matrix of an alkenyl aromatic resinous polymer. Such polymer blends may be prepared by a variety of methods including the polymerization of the alkenyl aromatic monomer in the presence of the block copolymer in suspension or alternatively by mechanical blending of such polymers. Generally, such block copolymers are more readily dispersed in the alkenyl aromatic resinous matrix than are homopolymers of the diene.

For many applications such alkenyl aromatic resinous polymer-diene polymer blends including graft copolymers have been prepared with the goal of obtaining a maximum functional physical properties balance. Generally, such a balance which is desirable results in the polymer having a high tensile strength and excellent physical toughness and a high heat distortion temperature. In the preparation of most blends, as the diene content of the blend is increased, the toughness also increases. However, as the toughness of the product or impact strength increases generally the tensile strength and heat distortion temperature substantially and significantly decreases.

In addition, in some applications involving contact with fats, oils or other chemical agents such as hydrocarbons and halocarbons, alkenyl aromatic resins are adversely affected and exhibit reduced impact resistance. This property known as environmental stress crack resistance is particularly desirable in containers for use in food, dairy and petroleum products. While environmental stress crack resistance is known to be improved by blending of a polyolefin with an alkenyl aromatic resin, such blends in the past have entailed a concomitant loss of other desirable properties. In particular, tensile strength, tensile modulus and creep resistance are normally adversely affected by the presence of a polyolefin resin.

Because of the widely varying requirements of impact resistance, environmental stress crack resistance and toughness in resinous products which might be prepared from a variety of preformed polymers, it would be desirable if such compositions could be prepared without the necessity of special polymerization techniques for the preparation of polymer blends having the desired physical properties for a given end use application.

Furthermore, it would be desirable if there were available synthetic resinous blends exhibiting high heat distortion temperature and if such blends were readily capable of preparation by conventional processing techniques.

It would also be desirable if such blends exhibited a high degree of toughness and impact resistance.

It would also be desirable if there were available blends of polymeric material suitable for food containers which are processed at elevated temperatures.

Finally, it would be desirable to provide a copolymer blend of an alkenyl aromatic resin demonstrating improved environmental stress crack resistance without loss of a significant amount of tensile modulus, tensile strength and creep resistance.

SUMMARY OF THE INVENTION

In accordance with the present invention there is now provided a copolymer blend comprising:

(a) from 40 to 75 weight percent of a copolymer of two or more alkenyl aromatic monomers of the formula:

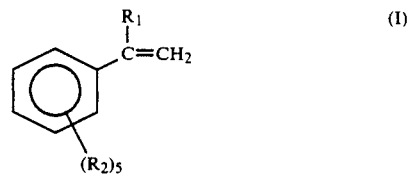

wherein $R_1$ is hydrogen or methyl; and $R_2$ independently each occurrence is hydrogen or methyl provided that the copolymer contains from about 10 to about 70 weight percent of an isopropenyl monomer of formula I;

(b) from 5 to 30 weight percent of a block copolymer of the configuration $AB(BA)n$, wherein n is an integer from about 1 to 5 and A represents styrene, and B represents a polymer of one or more polymerizable conjugated dienes, and B is from about 15 to 50 weight percent of the block copolymer;

(c) from 5 to 30 weight percent of a second block copolymer of the configuration $CD(DC)m$, wherein m is an integer from 1 to 5, and C is styrene, and D represents a polymer of one or more polymerizable conjugated dienes, the D component being from about 55 to about 80 weight percent of the second block copolymer; and (d) from 15 to 50 weight percent of a semicrystalline polyolefin.

DETAILED DESCRIPTION OF THE INVENTION

Copolymers of alkenyl aromatic monomers useful for the practice of the present invention are readily prepared by methods well known in the art. The copolymers useful in the present invention include in copolymerized form 2 or more monomers such as styrene, alpha-methylstyrene, paramethylstyrene, paramethylalpha-methylstyrene and the like. Polymerization of mixtures of such monomers is readily accomplished by mass polymerization, suspension polymerization, emulsion polymerization or solution polymerization utilizing either thermal initiation, free radical initiation or anionic initiation. Preferably such copolymers contain from about 50 to about 70 weight percent of polymerized isopropenyl monomer of formula I.

Copolymers useful in the practice of the present invention preferably have a weight average molecular weight determined by gel permeation chromatography of from about 60,000 to about 500,000 grams per mole, and beneficially from about 80,000 to about 250,000 grams per mole. Preferred copolymers are styrene-alpha-methylstyrene copolymers. Highly preferred are such copolymers prepared by anionic polymerization at a temperature near or above the ceiling temperature of the isopropenyl monomer containing reaction mixtures. Most preferred such copolymers are prepared at a temperature above 50° C.

On heat plastification, copolymers within the lower molecular weight range or lower than the desired molecular weight range, exhibit a highly desirable degree of fluidity on being heat plastified. However, such low molecular weight components frequently are of relatively low impact and tensile strength and tend to be somewhat brittle. Conversely, high molecular weight copolymers oftentimes exhibit a higher viscosity when heat plastified compared to lower molecular weight copolymers. In such compositions plasticizing agents may additionally be incorporated in order to retain desirable lower viscosity melted compositions.

Block copolymers for the practice of the present invention are most readily prepared by the use of anionic initiation techniques, are well known in the art, and are typified in the processes set forth in the following U.S. Pat. Nos.: 2,975,160; 3,031,432; 3,231,635; 3,238,173; 3,632,682; 4,089,913; 4,196,153; 4,196,154; and 4,525,532, the teachings of which are herewith incorporated by reference thereto. Such methods include the sequential polymerization of the block copolymer, employing a monofunctional catalyst for example, n-butyllithium, wherein either the A (or C) block or the B (or D) block may be polymerized in the absence of the other desired monomer or monomers. When the polymerization of one block is generally complete, monomer for the formation of the additional block is added to the linear polymer to form a block of the so-called AB (CD) configuration which is terminated by a lithium atom. Subsequent addition of more monomer will serve to either increase the length of one block or provide a block of different composition depending upon the monomer added to the reaction mixture.

Employing a multifunctional initiator, the diene component may be first polymerized to provide diene polymer having two or more living ends. On complete polymerization of the diene monomer, styrene monomer may be added to form terminal blocks of the A (or C) configuration.

An alternative method for the preparation of block copolymers useful in the practice of the present invention is the so-called coupling technique, wherein living polymers of AB (or CD) configuration are prepared having, for example, a lithium atom terminating the B (or D) block remote from the A (or C) block and contacting with a solution of the living polymer, a multifunctional active substance or coupling agent. Suitable coupling agents are well known in the art and may have from 2 to 6 or more active sites. In the event that the B (or D) block of an AB (or CD) block copolymer is terminated by an active moiety, such as a lithium atom in combination with a coupling agent having three or more active sites, such as carbon tetrachloride, a majority of the product generally results in a so-called star or radial block copolymer of the formula $AB(BA)_n$ (or $CD(DC)m$), wherein m or n is greater than 2. Depending on the particular coupling agent utilized, n (or m) is readily varied between integral values from 1 to 5 inclusive. Block copolymers useful in the practice of the present invention have weight average molecular weights as determined by gel permeation chromatography of from about 60,000 to 500,000 grams per mole and beneficially from about 80,000 to 200,000. Most preferably, the block copolymers are linear copolymers, i.e., m or n is equal to one.

Semicrystalline polyolefins suitable for the practice of the present invention include polymers of ethylene, propylene and like olefin compounds either as homopolymers or interpolymers. By the term "semicrystalline" is meant that the compositions demonstrate a minimum of at least 10 percent crystallinity. Preferred polyolefin polymers exhibit a melting point of at least 70° C. Most preferred polyolefins are high density polyethylene having a melt index (ASTM D1238-82, schedule E) of 0.5 to 20 and polypropylene, having a melt index (ASTM D1238-82, schedule L) of 2.0-25.

Blends in accordance with the present invention are readily prepared employing any one or more of several methods including mixing of the blend components when the blend components are in a heat plastified state. The mixing may be accomplished by any of a variety of mechanical mixing devices including single screw extruders, twin screw extruders, compounding rolls and other similar malaxating devices adapted to receive plastified synthetic resinous material and provide a desired degree of mixing or to receive such polymeric materials, heat plastify and mix them. In addition, blending of the various polymeric components can be achieved using solution blending techniques wherein the components are mixed in an inert solvent and the solvent is subsequently removed by evaporation or a like technique.

Various additives may additionally be incorporated into the copolymers according to known techniques. Examples of suitable additives include antioxidants, processing aids, colorants, fillers, reinforcing agents, stabilizers, pigments, antiblocking additives, blowing agents, etc.

Blending is continued until a suitably homogeneous product is achieved. The products are usefully employed as molding or extrusion resins in the preparation of containers, automotive components, etc. where improved resistance to environmental stress cracking is required.

The present invention is illustrated by, but not limited to the following examples. Percentages and parts are expressed as weight measurements.

EXAMPLE 1

A blend was prepared from pelletized resins by tumbling the various components in a polyethylene bag. Component (a) comprised 50 parts of a styrene/alpha-methylstyrene copolymer containing approximately 50 percent alpha-methylstyrene. The copolymer was prepared by anionic polymerization at a temperature of about 85° C. Component (b) comprised 12.5 parts of an ABA block copolymer wherein the A blocks comprised polystyrene and the B block comprised polybutadiene (KR03 available from Phillips Chemical Inc.). The polybutadiene content of component (b) was about 25 percent. Component (c) comprised 12.5 parts of an ABA block copolymer wherein the A blocks are polystyrene and the B block was polybutadiene. (Kraton D1102, available from Shell Chemical Inc.) The polybutadiene block was about 70 weight percent of the ABA copolymer. Component (d) was 25 parts of polypropylene resin having a melt flow rate of 12 (Hercules 6331).

After thorough dry mixing the resin blend was melt extruded twice in a 1.25" (32mm) Haake twin screw extruder at 200° C. Test bars were molded from the resulting pellets using a BOY laboratory injection molder at 200° C. The following properties were noted: Vicat Heat Distortion Temperature:125° C., Tensile Yield:4140 psi, percent elongation:4.7, Toughness:49 in-lbs/in$^2$, Youngs Modulus:283,000 psi. Environmental Stress crack resistance (ESCR) using a 50/50 mixture of cottonseed oil/oleic acid and 1,000 lb/in$^2$ loading substantially according to the procedure of R. A. Bubeck et al., Polymer Eng. Soc., 21, 624 (1981) was greater than 20,000 minutes.

What is claimed is:

1. A copolymer blend exhibiting high heat distortion temperatures and improved environmental stress crack resistance (ESCR) comprising:
    (a) from 40 to 75 weight percent of a copolymer consisting essentially of two or more alkenyl aromatic monomers of the formula:

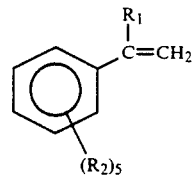

wherein $R_1$ is hydrogen or methyl; and $R_2$ independently each occurrence is hydrogen or methyl provided that the copolymer contains from about 10 to about 70 weight percent of an isopropenyl monomer of formula I;
    (b) from 5 to 30 weight percent of a block copolymer of the configuration AB(BA)n, wherein n is an integer from about 1 to 5 and A represents styrene and B represents a polymer of one or more polymerizable conjugated dienes, and B is from about 15 to 50 weight percent of the block copolymer;
    (c) from 5 to 30 weight percent of a second block copolymer of the configuration CD(DC)m, wherein m is an integer from 1 to 5, and C is styrene and D represents a polymer of one or more polymerizable conjugated dienes, the D component being from about 55 to about 80 weight percent of the second block copolymer; and
    (d) from 15 to 50 weight percent of a semicrystalline polyolefin, said copolymer blend being characterized in that the ESCR thereof is greater than the ESCR of a similar blend containing only components (a), (b) and (c).

2. A copolymer blend according to claim 1, wherein the copolymer of styrene and alpha-methylstyrene is prepared by anionic polymerization at a temperature above the ceiling temperature of the isopropenyl monomer containing reaction mixture.

3. A copolymer blend according to claim 1, wherein component (a) has a weight average molecular weight of from 60,000 to 500,000 grams/mole.

4. A copolymer blend according to claim 3, wherein component (a) has a weight average molecular weight of from about 80,000 to about 250,000 grams/mole.

5. A copolymer blend according to claim 1, wherein block copolymers (b) and (c) have weight average molecular weights from about 60,000 to about 500,000 grams/mole.

6. A copolymer blend according to claim 1, wherein block copolymers (b) and (c) have weight average molecular weights from about 80,000 to about 200,000 grams/mole.

7. A copolymer blend according to claim 1, wherein component (d) is high density polyethylene having a melt index according to ASTM D1238-82, schedule E of 0.5 to 20 or polypropylene having a melt index according to ASTM D1238-82, schedule L of 2.0–25.

8. A copolymer blend according to claim 1, wherein component (a) contains from about 50 to about 70 weight percent of an isopropenyl monomer of formula I.

* * * * *